A. DRUMMOND.
LATHE.
APPLICATION FILED JULY 27, 1921.
1,415,228.
Patented May 9, 1922.
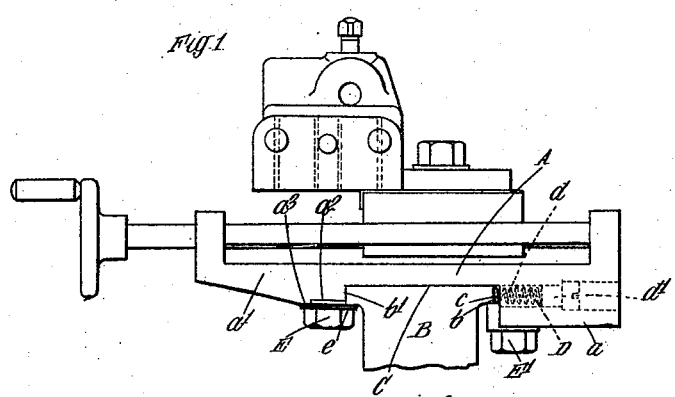
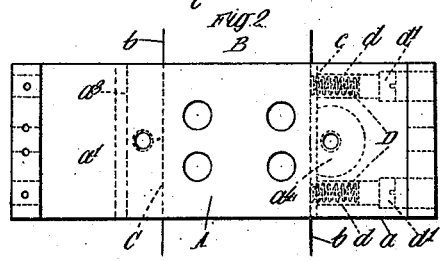
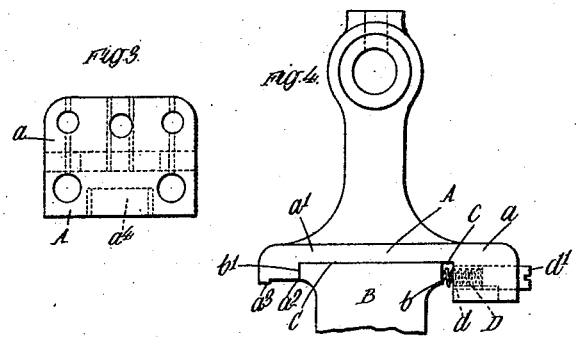

UNITED STATES PATENT OFFICE.

ARTHUR DRUMMOND, OF RYDE'S HILL, NEAR GUILDFORD, ENGLAND.

LATHE.

1,415,228.  Specification of Letters Patent.  Patented May 9, 1922.

Application filed July 27, 1921. Serial No. 487,981.

(GRANTED UNDER THE PROVISIONS OF THE ACT OF MARCH 3, 1921, 41 STAT. L., 1313.)

*To all whom it may concern:*

Be it known that I, ARTHUR DRUMMOND, a subject of the King of Great Britain, residing at Ryde's Hill, near Guilford, in the county of Surrey, England, have invented certain new and useful Improvements in or Relating to Lathes, (for which I have filed an application in Great Britain July 12, 1919, Patent No. 144,495,) of which the following is a specification.

This invention relates to lathes and particularly to the sliding members of lathes, such as the slide rests and tail stocks, and has for its chief object to enable such members to slide with reasonable accuracy upon the lathe bed or other supporting part while eliminating the high accuracy of workmanship necessary for such members as usually constructed, such accurate work involving considerable expense.

According to this invention the sliding member mounted on the bed or other guide having a pair of substantially parallel guiding surfaces at opposite sides, is pressed into close sliding contact with one only of the said guiding surfaces by spring pressure acting against the opposite guiding surface, between which latter surface and the sliding member is a clearance. For a small and cheap lathe, for which this invention is especially but not exclusively intended, the spring device may consist simply of small helical springs inserted in holes in the side of the sliding member and held in place by screw plugs, the exposed ends of the springs bearing directly on the second guiding surface.

In order that the said invention may be clearly understood and readily carried into effect the same will now be described more fully with reference to the accompanying drawings, in which:—

Figure 1 is an elevation of a slide rest mounted upon a lathe bed and embodying a fitting according to this invention.

Figures 2 and 3 are respectively a plan and rear view of the slide rest; and

Figure 4 shows a tail stock embodying the same fitting.

A is the sliding member (the slide rest in Figures 1 to 3 and the tail stock in Figure 4). B is the lathe bed. C is a recess or channel at the bottom of the sliding member and enclosing the upper part of the lathe bed, leaving a clearance $c$ at the rear side. D, D are springs enclosed in holes $d$ in the sliding member A and adapted to bear against the face $b$ of the lathe bed. E, E' are the securing bolts by which the sliding member is fixed on the bed when adjusted in position.

The actual guiding of the sliding member A is effected only by the guiding front surface $b'$ of the top of the lathe bed, this surface being made carefully parallel with the lathe axis. As the actual guiding is effected by the surface $b'$ and the springs D (usually a pair of springs would be provided as shown) take up any inequalities, there is no need for parallelism between the two surfaces $b$ and $b'$ and provided the surface $b'$ is parallel with the lathe axis, a condition easily attained on machining the bed, the slide rest and tail stock must slide parallel to the axis and maintain good alignment.

The sliding members A are cast to shape with the channel C of somewhat greater width than the lathe bed B (or other guide) to provide for the clearance $c$ and the channel is machined to provide a sufficiently smooth bearing surface. The side $a$ receiving the springs may be made deeper than the opposite side $a'$, which may be slightly rebated at $a^2$ leaving an outer rib or shoulder $a^3$ against which bears one side of a washer $e$ belonging to the usual locking bolt E, the other side of the washer binding on the under side of the edge of the bed. The sliding member A is cast with a recess $a^4$ at the thicker side $a$ to receive the corresponding washer and head of the locking bolt E' at that side.

The springs D are retained in their holes by the small screw plugs $d'$, the springs being pushed into their holes after the sliding member is placed on the bed or other guide and the screw plugs being then inserted to press the springs against the face $b$ with the required force to maintain the other side of the channel C firmly against the guiding face $b'$ of the bed.

On loosening the bolts E, E' the sliding members are free to be adjusted along the bed to the required position, whereupon the bolts are tightened up and secure the members firmly in place.

What I claim and desire to secure by Letters Patent of the United States is:—

1. In means for fitting the sliding members of lathes on the bed or other guide, a guide having a pair of substantially parallel guiding surfaces at opposite sides, a guiding surface on one side of the said sliding member adapted to slide in close contact with one only of the said guiding surfaces, and resilient pressure applying means situated between the sliding member and the second guide surface between which the sliding member is a clearance, for the purpose specified.

2. In means for fitting the sliding members of lathes on the bed or other guide, a guide having a pair of substantially parallel guiding surfaces at opposite sides, the sliding member having a channel at its underside of greater width than the said guide, and springs situated between one of the guiding surfaces and the corresponding side of the said channel, which springs maintain the opposite side of the channel of the sliding member in close sliding contact with the adjacent guiding surface, for the purpose specified.

3. In a lathe, a lathe bed having two parallel guiding surfaces, a slide rest having at its underside a channel of greater width than the top of the lathe bed, recesses in the slide rest at one side of the said channel and springs fitted within the said recesses and bearing against the adjacent guiding surface of the bed, whereby the opposite side of the slide rest channel is held closely in sliding contact with the adjacent guiding surface of the bed for the purpose specified.

4. In a lathe, a lathe bed having two parallel guiding surfaces, a slide rest having at its underside a channel of greater width than the top of the lathe bed, recesses in the slide rest at one side of the said channel and springs fitted within the said recesses and bearing against the adjacent guiding surface of the bed, whereby the opposite side of the slide rest channel is held closely in sliding contact with the adjacent guiding surface of the bed, screw plugs fitted in the holes receiving the said springs and adapted to press the springs against the guiding surface.

ARTHUR DRUMMOND.